United States Patent [19]
Kicinski

[11] Patent Number: 5,321,215
[45] Date of Patent: Jun. 14, 1994

[54] VERTICAL EXHAUST SYSTEM INCORPORATING A WATER TRAP

[75] Inventor: Kenneth J. Kicinski, Sun Prairie, Wis.

[73] Assignee: Nelson Industries, Inc., Stoughton, Wis.

[21] Appl. No.: 60,229

[22] Filed: May 11, 1993

[51] Int. Cl.⁵ ............................................. F01N 5/00
[52] U.S. Cl. .................................. 181/211; 181/227; 181/255; 181/258; 181/264; 181/272
[58] Field of Search ............... 181/211, 227, 228, 231, 181/232, 244, 255, 258, 264, 272; 60/288, 289

[56] References Cited

U.S. PATENT DOCUMENTS

| | | | |
|---|---|---|---|
| 2,482,577 | 9/1949 | Dahlstrom | 181/211 |
| 2,721,619 | 10/1955 | Cheairs | 181/228 |
| 2,732,913 | 1/1956 | Higgins | 181/211 |
| 4,032,310 | 6/1977 | Ignoffo | 181/258 X |
| 4,450,934 | 5/1984 | Davis | 181/228 |
| 4,527,659 | 7/1988 | Harrington | 181/144 |
| 5,170,020 | 12/1992 | Kruger et al. | 181/211 |

Primary Examiner—Michael L. Gellner
Assistant Examiner—Khanh Dang
Attorney, Agent, or Firm—Andrus, Sceales, Starke & Sawall

[57] ABSTRACT

A vertical exhaust system for an internal combustion engine that incorporates a provision for receiving and trapping water, such as rain, that may enter the open upper end of the exhaust conduit. The exhaust system includes a vertical outer body and a perforated tube is disposed within the outer body and spaced therefrom to provide an annular chamber therebetween. A plug or closure is secured within the tube and is spaced from the lower end of the tube, thus closing off the tube. An annular flange interconnects the inner tube with the outer body and is spaced longitudinally below the plug, to thereby enclose the lower end of the chamber. A drain hole extends through the outer body and connects the chamber with the exterior. The drain hole is spaced above the flange, so that the space between the flange and the drain hole comprises a trap to collect water that may enter the upper end of the exhaust system.

8 Claims, 1 Drawing Sheet

VERTICAL EXHAUST SYSTEM INCORPORATING A WATER TRAP

BACKGROUND OF THE INVENTION

Many heavy duty vehicles, such as trucks, tractors, off-road equipment, and the like, utilize a vertical exhaust system, in which the exhaust conduit extends vertically alongside the cab of the vehicle. Recently government regulations designed to reduce emissions have required that catalytic converters be incorporated in the exhaust system of certain types of truck engines. If the catalytic converter is mounted in the vertical exhaust system, there is a possibility that water, such as rain, snow or truck wash, can enter the upper end of the exhaust system and flow downwardly into contact with the catalytic converter unit. The water entering the system can be absorbed in the vermiculite matt that is located between the outer surface of the catalytic converter and the outer body of the exhaust conduit, and if the water absorbed in the matt freezes, retention can be lost between the catalytic converter and the outer body. Further, freezing of water in the catalytic converter could cause structural damage to the monolithic catalyst. As an additional problem, water flowing through the catalytic converter may tend to wash particulate material downwardly where the particulate material collects and clogs the lower surface of the catalytic converter causing premature failure of the catalytic converter.

It has been proposed to enclose the upper end of a vertical exhaust system with a rain cap to prevent rain and snow from entering the exhaust system. However, a rain cap adds to the overall cost of the exhaust system and may rattle or vibrate during engine operation. Moreover, many vehicle manufacturers will not specify rain caps because they detract from the aesthetic appearance of the exhaust system.

SUMMARY OF THE INVENTION

The invention is directed to a vertical exhaust system for an internal combustion engine that incorporates a provision for trapping water, such as rain, that may enter the open upper end of the exhaust system.

In accordance with the invention, the exhaust system includes a vertical metal outer body having a lower or upstream end to receive exhaust gas from an internal combustion engine. A perforated outlet tube is spaced radially inward of the outer body to provide an annular chamber or clearance therebetween, and an upper portion of the tube is closed off by a plug or closure, so that the exhaust gas flowing upwardly through the tube will be directed outwardly by the plug, through the perforations to the annular chamber, and then inwardly through the upper group of perforations to the outlet tube, above the plug, for discharge to the atmosphere.

In accordance with the invention, an annular flange is interconnected between the inner tube and the outer body and is spaced longitudinally below the plug and encloses the lower end of the chamber. Spaced above the flange is a drain hole in the outer body which provides communication between the annular chamber and the exterior.

Water entering the upper end of the outlet tube will be directed downwardly along the inner surface of the outer body and be collected in the trap. On starting of the engine, the water collected in the trap will be evaporated and will be discharged through the upper end of the exhaust system, along with the exhaust gas.

In a preferred form of the invention, a catalytic converter unit is located in the outer body and spaced beneath the outlet tube so that water collected in the trap will be prevented from contacting the catalytic converter.

In one form of the invention, the plug or closure, which closes off the outlet tube, is spaced from the ends of the tube, dividing the tube into an upper perforated section and a lower perforated section. Water entering the upper end of the outlet tube will be directed outwardly by the plug through the lowermost perforations of the upper perforated section, to the annular chamber. An annular deflector projects radially outward from the inner tube and is located at a level beneath the plug, thus diverting the water flowing outwardly from the upper perforated section toward the inner surface of the outer body.

Located within the outlet tube, at the lower end of the lower perforated section, is an annular baffle which directs any water which may flow downwardly along the inner surface of the tube outwardly through the lowermost perforations in the lower perforated section, and this water will then flow along the outer surface of the tube to the water trap.

The invention can be incorporated with exhaust systems having a catalytic converter unit, or with exhaust systems that do not include a catalytic converter. In either case, water is prevented from flowing downwardly through the exhaust system into contact with the catalytic converter or with the engine.

The use of the water trap or sump enables the water to accumulate in the outer body and prevents the water from dripping downwardly along the outer surface of the outer body and causing possible discoloration of the outer body by carbon deposits which may be incorporated in the water.

The water trap is incorporated within the confines of the outer body of the exhaust system, so that there are no external projections or protuberances which could detract from the styling of the exhaust system.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
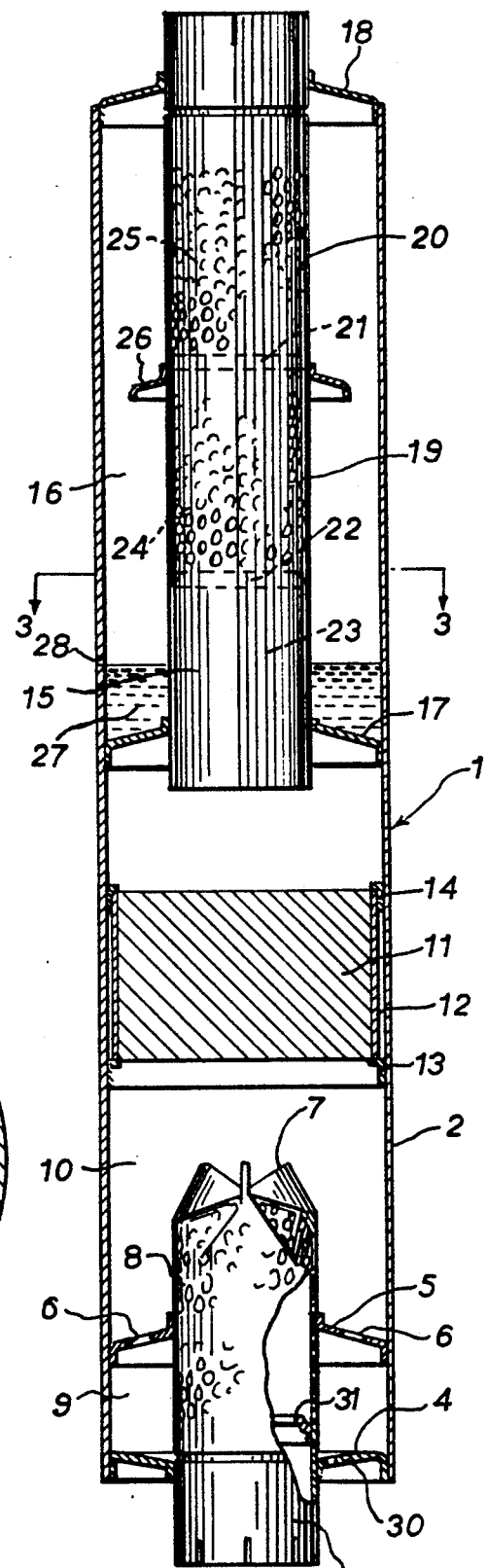
FIG. 1 is a longitudinal section of a combination muffler and catalytic converter incorporating the invention.

FIG. 1 illustrates a combination muffler and catalytic converter 1 for an internal combustion engine, and includes an outer tubular body 2 that is oriented vertically. Exhaust gas from the engine is introduced into the body 2 through an inlet tube 3 which is spaced inwardly from the outer body and is connected to the outer body by a pair of flanges 4 and 5. Flange 5 contains a series of circumferentially spaced holes 6.

The upper end of inlet tube 3 is closed off, such as by crimping as indicated by 7, and the upper portion of the inlet tube is provided with a multiplicity of perforations 8. A portion of the exhaust gas entering in the inlet tube 3 will pass through the perforations 8 in the lower end of tube 3 and into the chamber 9 between the tube 3 and outer body 2, and then through the holes 6 to the chamber 10, while a second portion of the exhaust gas will flow through the perforations in the upper end of tube 3 directly to the chamber 10.

Mounted in the outer body and spaced upwardly of the inlet tube 3 is a catalytic element 11. The catalytic unit can be a conventional monolithic type and the outer peripheral surface of the element is enclosed by a layer of ceramic substrate 12. Element 11 is maintained in position within the outer body by a lower annular flange 13 which engages the lower surface of the catalytic element, and a ring 14 which is secured to the outer body and engages the upper peripheral edge of the element.

Figure 2:
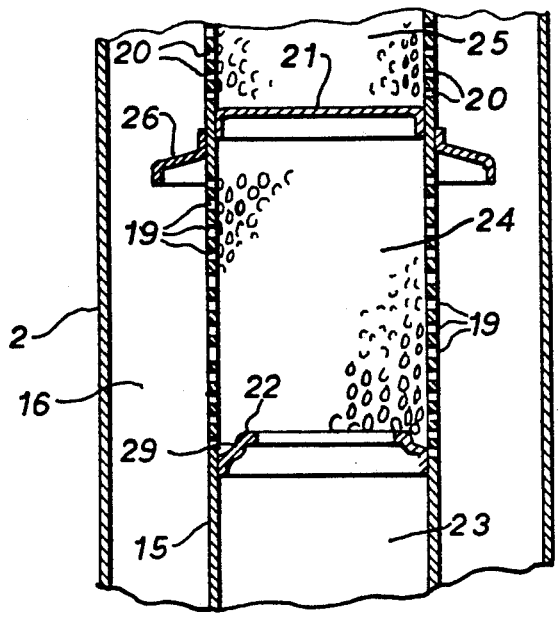
FIG. 2 is a fragmentary enlarged view of the upper end portion of the construction shown in FIG. 1.
Figure 3:
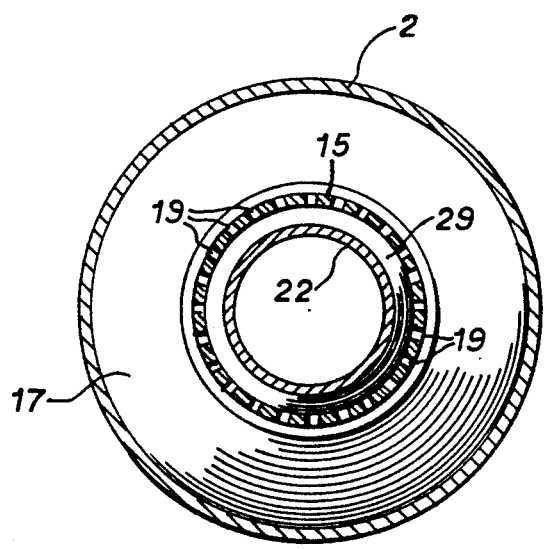
FIG. 3 is a section taken along line 3—3 of FIG. 1.

The exhaust gas, after passing through the catalytic element 11, is discharged from the outer body through an outlet tube 15 which is spaced inwardly of the outer body to provide an annular chamber 16 therebetween. To support the tube 15 from the outer body, a lower flange 17 is connected between the lower end of tube 15 and the outer body, while an upper flange 18 connects the upper end of tube 15 to the upper end of body 2. A length of the outlet tube 15 is provided with two longitudinally spaced groups or sections of perforations 19 and 20. Located between the two groups of perforations 19 and 20 is a plug or closure 21, which closes of the central portion of tube 15, as best seen in FIG. 2. In addition, a ring 22 is secured to the inner surface of tube 15 and is located immediately beneath the group of perforations 19, as best shown in FIG. 2. Thus, the tube 15 is divided into three chambers, a lower chamber 23, an intermediate chamber 24 which is located between plug 21 and ring 22, and an upper chamber 25 which is located above the plug 21.

The exhaust gas after flowing through the catalytic element 11, enters the lower chamber 23 of tube 15 and passes through the central opening in ring 22 to the intermediate chamber 24. The exhaust gas then flows outwardly through the lower group of perforations 19 to the annular chamber 16 and then flows radially inward through the second group of perforations 20 into the upper chamber 25 and is then discharged from the upper end of the tube 15.

As the combination muffler and catalytic converter 21 is mounted vertically, there is the possibility that rain, snow, or truck wash may enter the upper end of outlet tube 15. The apparatus thus includes a provision for preventing this moisture from contacting the catalytic element 11. In this regard, an annular or ring-shaped deflector 26 is mounted on the outer surface of tube 15 and is located immediately beneath plug 21 and intermediate the two groups of perforations 19 and 20. Any moisture flowing downwardly within the upper chamber 25 of tube 15 will flow outwardly through the lowermost perforations of the group 20 and be deflected radially outward by the deflector 26. Thus, the majority of the moisture will flow downwardly along the inner surface of the outer body 2 and be collected in the trap 27 above the lower flange 17. A drain opening 28 is provided in the outer body 2, a substantial distance above the flange 17, and if the moisture collects to the level of drain 28, the excess moisture will drain outwardly of the outer body.

A portion of the moisture flowing outwardly on deflector 26 may flow inwardly through the lower perforations 19 and along the inner surface of the tube 15. Any moisture flowing along the inner surface of tube 15 will be directed outwardly through the lowermost row of perforations 19 by the ring 22. This moisture will then flow along the outer surface of tube 15 and be collected in the trap 27. Ring 22 has an upper surface 29 that slopes downwardly and outwardly to direct the water outwardly through the lowermost perforations 19.

When the engine is started, the moisture collected in trap 27 will be heated and evaporated and the vapor will pass out of the upper end of the tube 15 with the exhaust gas.

In the event a small amount of moisture is not collected in trap 27, and instead flows downwardly from the lower end of tube 15 into through the catalytic element 11, this moisture, entering chamber 10 will flow through the holes 6 in flange 5 into chamber 9 and be discharged from the chamber 9 through a drain opening 30 in flange 4. If a small portion of this moisture should enter the perforations 8 in tube 3, a ring 31 is secured within the inlet tube 3, beneath the group of perforations 8, and any water entering the inlet tube 3 through the perforations 8 will be deflected outwardly by the ring through the lowermost row of perforations into the chamber 9. This water will then be discharged through the drain opening 30.

While the drawings illustrate the invention as utilized with a combination muffler and catalytic converter, it is contemplated that the invention can also be incorporated with other types of vertical exhaust conduits. It is also recognized that the exhaust gas can be discharged through the upper end of the outer body, as opposed to being discharged through the upper end of the outlet tube, as shown in the drawings. In either case, the water is prevented from flowing downwardly through the exhaust system.

The use of the water trap 27 prevents the water from dripping downwardly along the outer surface of the outer body, thus preventing possible discoloration of the outer body by carbon deposits which may be incorporated in the water.

The water trap is incorporated within the confines of the outer body, so that there are no external projections which increase the external dimension of the exhaust system.

Various modes of carrying out the invention are contemplated as being within the scope of the following claims particularly pointing out and distinctly claiming the subject matter which is regarded as the invention.

I claim:

1. In a vertical exhaust system, a vertical outer body having a lower end to receive exhaust gas from an internal combustion engine, a perforated tube having a plurality of perforations and disposed in the outer body and spaced radially inward of the outer body to provide an annular chamber therebetween, a plug disposed within the tube and spaced from a lower end of the tube to close off said tube, an annular closure member connected between the tube and the outer body and spaced longitudinally below said plug and enclosing a lower end of the chamber, diverting means disposed within said tube and located above said annular closure means for diverting water flowing downwardly along an inner surface of said tube radially outward and through said perforations into said chamber, and drain means connecting the chamber with the exterior for draining water from the chamber.

2. The exhaust system of claim 1, and including deflector means extending radially outward from the tube and located above said closure, said deflector means having a peripheral edge spaced from the outer body, said deflector means serving to divert water radially outward toward said outer body.

3. The system of claim 1, wherein said diverting means comprises a ring secured to an inner surface of said tube and having an annular surface sloping downward and radially outward toward said tube.

4. The system of claim 1, and including a catalytic element disposed in said outer body and spaced below said tube.

5. In an exhaust system, a vertical outer body having a lower end to receive exhaust gas from an engine, a tube disposed within the outer body and spaced from the outer body to provide an annular chamber therebetween, plug means disposed within said tube and spaced from a lower end of the tube to close said tube, a group of first perforations in said tube and located below said plug means, a group of second perforations in said tube and located above said plug means, an annular closure connecting the tube to the outer body and enclosing the lower portion of said chamber, said closure being spaced longitudinally below said group of first perforations, an annular diverting member mounted within the tube and located beneath said group of first perforations, said diverting member including a sloping surface extending downwardly and outwardly toward said outer body for diverting moisture flowing along an inner surface of said tube outwardly through the first perforations and into said chamber, and drain means connecting the chamber with the exterior and disposed above said annular closure for draining water from said chamber.

6. The exhaust system of claim 5, and including an annular deflector extending radially outward from the tube and located between said group of first perforations and said group of second perforations, said deflector deflecting any moisture passing outwardly through said second perforations toward said outer body.

7. The exhaust system of claim 5, and including a tubular inlet member connected to the lower end of said outer body for introducing exhaust gas into said outer body, and a catalytic element disposed in said outer body and spaced between the inlet member and the tube.

8. In an exhaust system, a vertical outer body, an outlet tube disposed within the outer body and spaced from the outer body to provide an annular chamber therebetween, said outlet tube having an upper end having a lower end disposed within the body, a catalytic element disposed in said outer body and spaced below the lower end of the outlet tube, an inlet tube for introducing exhaust gas into said outer body and having an upper end spaced beneath the catalytic element, a plug disposed within said outlet tube and spaced from the lower end of the outlet tube to close said outlet tube, a group of first perforations in said outlet tube and located below said plug, a group of second perforations in said outlet tube and located above said plug, an annular closure connecting the outlet tube to the outer body and enclosing the lower portion of said chamber, said annular closure being spaced longitudinally below said group of first perforations, an annular deflector extending radially outward from said outlet tube and located between said group of first perforations and said group of second perforations, and a drain extending radially outward through said outer body and communicating with the lower end of said chamber for draining water from said chamber.

* * * * *